Feb. 3, 1953 — V. R. KIMBALL — 2,627,245
DIAL AND POINTER ASSEMBLY FOR INDICATORS
Filed July 9, 1948
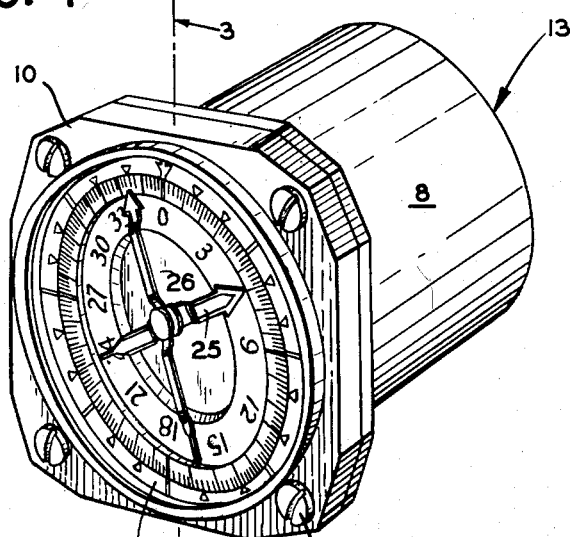
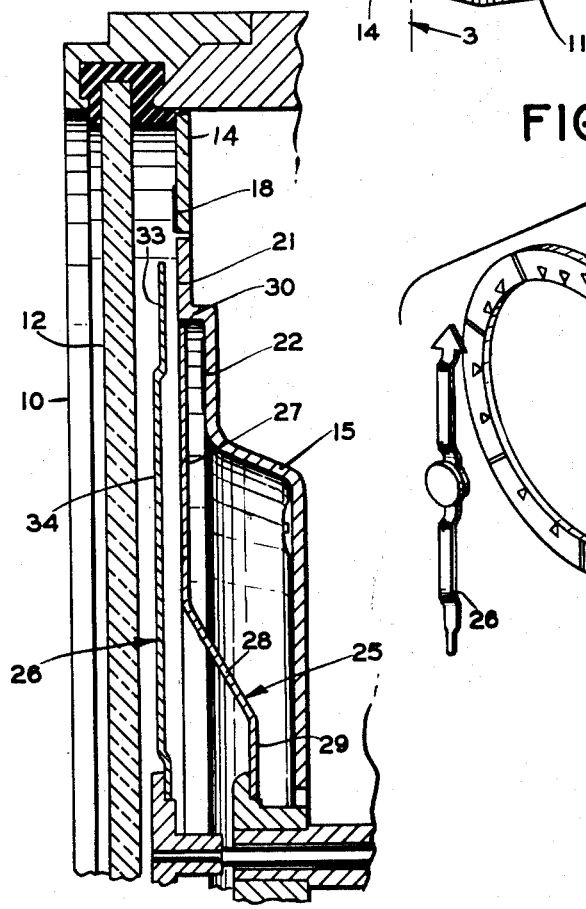
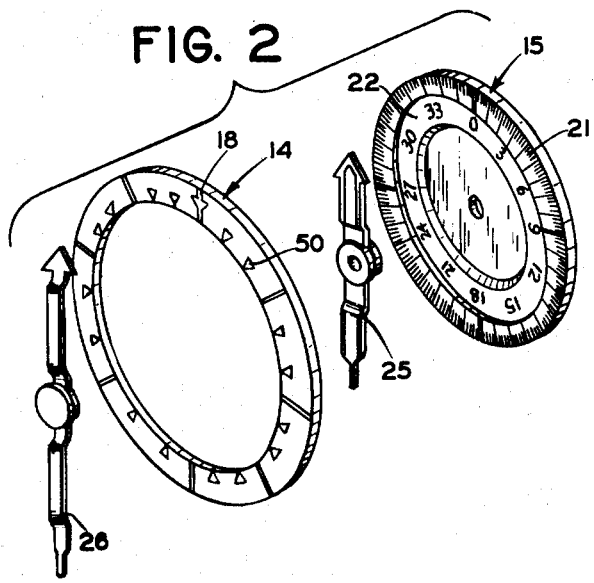
INVENTOR.
VERNON R. KIMBALL
BY
- ATTORNEY -

Patented Feb. 3, 1953

2,627,245

UNITED STATES PATENT OFFICE 2,627,245

DIAL AND POINTER ASSEMBLY FOR INDICATORS

Vernon R. Kimball, Maywood, N. J., assignor to Bendix Aviation Corporation, Teterboro, N. J., a corporation of Delaware Application July 9, 1948, Serial No. 37,959

9 Claims. (Cl. 116—129)

This invention relates generally to navigation instruments and has specific reference to such instruments including means and methods for indicating information in guidance systems.

In systems where a combination of indications is afforded for concurrently giving guidance information, it is desirable that human error associated with reading such indications be minimized as far as possible. Thus, in systems where a combination of pointers and dials are utilized to obtain readings, it is of great advantage to so place the pointers utilized in the instrument as near the dials containing the calibrations or indicia as possible.

The present invention minimizes parallax, or angle of observation, error due to depth of displacement of dials and pointers with respect to each other, and gives substantially errorless readings.

Thus, there is here disclosed a novel indicating instrument in which each pointer is intimately associated with its own reference dial and where, because of a stepped arrangement of dials and pointers, an extremely close proximity between the covering glass of the indicator and the dials is afforded. Further in the operation of the indicator a wide angle of vision is obtained because the components of the indicator are compactly arranged. This gives a simplicity in construction which allows for a substantial reduction of the overall spatial requirements of the instrument. The indicator has, therefore, special utility in that it is adapted to be used in panel arrangements where space is at a premium.

It is, therefore, one of the objects of the present invention to provide an indicator having a plurality of dials and pointers which are so cooperatively arranged and combined as to afford minimum error readings.

Another object of the present invention is to provide, in an indicating system, a novel dial and pointer combination wherein the dials and pointers are constructed in compact arrangement to give substantially accurate readings at all times.

Still another object of the invention is to provide an improved construction for indicating instruments in which more than one pointer utilized therein is intimately associated with its reference dial.

Yet another object of the present invention is to provide a step type indicator for use in navigation instrument systems and where a multiplicity of dials and pointers may be combined so as to give information in a substantially errorless manner.

A further object of the present invention is to provide an errorless type indicator having a rotating dial showing a magnetic heading and a fixed dial carrying a lubber line in combination with a plurality of pointers adapted to respond to radio information.

Still another object of the invention is to provide a combination type indicator for use in radio navigation systems wherein a plurality of dials and pointers used to define such information may be combined so that parallax error is reduced between said dials and said pointers.

A further object of the present invention is to provide an indicator having components plurally arranged with reference to each other so as to give a combination of readings and wherein a wide angle of vision is available so as to reduce the parallax error in said readings to a minimum.

Still another object of the present invention is to provide means, apparatus and instrumentalities adapted for attaining the foregoing objects whether such uses or means have been particularly referred to or not.

Referring to the drawings in which similar reference numerals refer to like parts, Figure 1 is a profile view of a preferred embodiment of the invention used to illustrate the arrangement of the combination of pointers and dials as seen by an operator, Figure 2 is an exploded view of the indicator face used to show the combination of dials and pointers as used in an embodiment of the invention, and Figure 3 is a cross-sectional view of the embodiment of the invention as shown in Figure 1 taken along line 3—3 thereof.

Generally speaking, the hereinafter described invention describes an indicator for giving a group of separable readings and comprises, in combination, a plurality of calibrated scales for giving heading and bearing information. One of these scales is fixed and adjacently circumscribes the other movable scale. The movable scale has a stepped down arrangement, being offset vertically with respect to the fixed scale in a plane parallel thereto. A plurality of pointers, adapted to move in response to received radio signals, are suitably mounted with respect thereto and are constructed so as to conform to the stepped relationship of the scales or dials, i. e.: one of the pointers has connected sections in parallel planes, but vertically offset from each other. All the components are then disposed within a case having a flat covering glass. This novel arrangement of dials and pointers thus obviates parallax error since all components are efficiently, simply and compactly arranged in depth so that angular ocular deviation is avoided.

Referring now to the drawing, Figures 1 and 2 show the structural combination of the individual dials and pointers, with Figure 1 showing the assembly arrangement thereof, and Figure 2 showing the inter-relation of the dials and pointers to form the indicator assembly.

In Figure 1, a multiple-purpose flight and navigation indicator 8 is shown. Indicator 8 is designed for use by an operator and/or pilot in navigating and maintaining the direction of the aircraft without the necessity for numerical or graphical calculations. Indicator 8 is suitably mounted on an instrument panel as by means of a bezel frame 10 and bezel screws 11. Indicator 8 includes a circumferential dial 14 which is fixed and contains a lubber line 18 having calibrations or markings 50 arranged to read 360 degrees at 15° intervals. An inner dial 15 is positioned within circumferential dial 14, adjacent thereto, and comprising step portions 21 and 22. Dial 15 is arranged to be actuated from a remote magnetic compass (not shown) to indicate the magnetic heading of the aircraft when read on the lubber line 18. Step 21 of dial 15 is calibrated in 2° increments from zero to 360°, while step portion 22 of dial 15 is marked off in numerals designating larger degree units, for example, 10°.

Two radio pointers 25 and 26 are used to repeat the directions from radio direction finder loops (not shown) with respect to the rotating compass dial 15. Radio pointers or hands 25, 26 are individually mounted so as to individually respond to signals received from the radio direction finder loops.

Radio pointer 25, as more suitably shown in Figure 3, comprises sections 27, 28 and 29. Sections 27 and 29 are in planes parallel with respect to each other but offset vertically by means of section 28 so as to conform intimately with the stepped arrangement of inner dial 15. Section 27 of radio pointer 25 is of greater longitudinal extent than the other sections of pointer 25 and is terminated immediately below a connecting section 30 which joins step portions 21 and 22 of inner dial 15. Section 27 overlies step portion 22 and is used to read the large unit calibrations impressed thereon. Radio pointer 26 comprises sections 33 and 34, with section 33 arranged to overlie the 2° increments impressed on step portion 21 of inner dial 15.

The entire assembly of dial and pointers as described above is placed within dust cover 13. A flat cover glass 12 is placed within bezel 10 to complete the assembly.

The above described indicator comprising a stepped rotating dial, having graduations placed on its uppermost step and numbered as required on a recessed face, used in combination with dual radio pointers intimately conforming therewith, has the advantage of reducing parallax error, resulting from a depth displacement between pointers and their associated dials, to a minimum and allows the pilot to have a wider angle of vision for reading the dials.

Since various changes and modifications to the form and relative arrangement of the parts described herein may appear to those skilled in the art, it is not intended that the scope of the invention be restricted to the recitations made herein, but rather is to be obtained from a reading of the specification in conjunction with the here appended claims.

Having thus described my invention, I claim as new and desire to secure by Letters Patent:

1. In an indicator for defining a combination of individual readings, a plurality of dials relatively rotatable with respect to each other having calibrations thereon for giving desired reading information, one of said dials having a stepped indicia bearing portion, and plural pointer means associated with said dials for pointing out information therefrom, one of said pointers having an off-set section for cooperation with said stepped indicia bearing portion.

2. An indicator for giving a group of readings comprising in combination, a plurality of scales, said scales calibrated to give heading and bearing information respectively, one of said scales being fixed and circumscribing said other scales, one of said other scales being vertically offset with respect to said fixed scale in a plane parallel thereto, and a plurality of pointers cooperatively associated with said scales, one of said pointers having sections vertically offset from each other in parallel planes in conformity with the offset relationship of said scales whereby readings encompassed by the use of said pointers in relation to said scales obviate angular ocular deviation.

3. An indicator for defining a group of separate readings comprising in combination, a plurality of scales, said scales separately calibrated to give heading and bearing information respectively, one of said scales being relatively rotatable with respect to the other and having an offset vertical relationship therewith in a plane parallel thereto, and a plurality of pointers cooperatively associated with said scales for reading information therefrom, one of said pointers intimately conforming with said vertically offset scale for easeful reading thereof, said pointers being individually mounted to give a compact combination of indicator elements to afford the use of the indicator in close quarters.

4. A navigation instrument for use in mobile craft, comprising a rotatable dial having graduations thereon, said dial having parallel step portions, a fixed dial peripherally adjacent said rotatable dial, said fixed dial having a lubber line for cooperation with said rotatable dial, and plural pointers mounted for independent movement with respect to said rotatable dial, one of said pointers having offset sections permitting movement thereof within the stepped portions of said rotatable dial, and the other of said pointers being spaced from said one pointer and movable in a plane parallel to the uppermost step portion of said rotatable dial.

5. In an indicating device of the kind described, a rotatable dial having parallel offset sections bearing calibrations thereon, a fixed dial circumscribing said rotatable dial, and a plurality of pointers movable independently of said rotatable dial for cooperation with said dials, one of said pointers having spaced offset sections, one of which is arranged in a plane parallel to one of the offset sections of said rotatable dial.

6. In an indicating device of the kind described, a fixed dial having calibrated graduations thereon, a rotatable dial associated with said fixed dial and having vertically spaced indicia bearing portions, and a plurality of pointers associated with said dials for cooperation therewith, one of said pointers having vertical offset sections with one of said sections being arranged in the same plane as one of the indicia bearing portions of said rotatable dial.

7. A navigation instrument for use in mobile craft comprising in combination, a rotatable dial calibrated to show the heading of said craft and having a recessed portion formed thereon, a fixed dial adjacent said rotatable dial and calibrated in degrees, and a plurality of pointers cooperating with said dials, one of said pointers having an off-set section conforming to the recessed portion of said rotatable dial so as to permit movement thereof within the dial.

8. A navigation instrument for use in mobile craft comprising in combination, a rotatable dial calibrated to show the heading of said craft and having a plurality of off-set portions at least one of which is provided with indicia, a fixed dial adjacent said rotatable dial and calibrated in degrees, and a plurality of pointers cooperating with said dials, one of said pointers having sections vertically off-set from each other and conforming to the off-set portions of said rotatable dial.

9. A navigation instrument for use in mobile craft, comprising a rotatable dial calibrated to show magnetic heading of said craft and having a plurality of off-set portions at least one of which bears indicia thereon, a fixed dial adjacent and peripherally circumscribing said rotatable dial, said fixed dial being calibrated in degrees and having a lubber line thereon, and a plurality of pointers cooperating with said dials, said pointers being individually rotatable about a common axis and one of said pointers having an off-set section cooperating with the off-set indicia bearing portion of the rotatable dial.

VERNON R. KIMBALL.

REFERENCES CITED

The following references are of record in the file of this patent:

UNITED STATES PATENTS

| Number | Name | Date |
|---|---|---|
| 43,036 | Martin | June 7, 1864 |
| 1,352,719 | Baldwin | Sept. 14, 1920 |
| 1,617,310 | Sperry | Feb. 8, 1927 |
| 1,715,270 | Bassett | May 28, 1929 |
| 2,470,482 | Gabrielson | May 17, 1949 |